US009190946B2

(12) United States Patent

Shibata et al.

(10) Patent No.: US 9,190,946 B2
(45) Date of Patent: Nov. 17, 2015

(54) SPINDLE POSITIONING DEVICE

(71) Applicant: OKUMA Corporation, Aichi (JP)

(72) Inventors: Tomohiro Shibata, Aichi (JP); Tomohisa Kameyama, Aichi (JP)

(73) Assignee: OKUMA Corporation, Aichi (JP)

( * ) Notice: Subject to any disclaimer, the term of this patent is extended or adjusted under 35 U.S.C. 154(b) by 245 days.

(21) Appl. No.: 13/783,926

(22) Filed: Mar. 4, 2013

(65) Prior Publication Data

US 2013/0234643 A1 Sep. 12, 2013

(30) Foreign Application Priority Data

Mar. 6, 2012 (JP) ................................ 2012-049211

(51) Int. Cl.

| | |
|---|---|
| ***H02P 3/14*** | (2006.01) |
| ***H02P 23/00*** | (2006.01) |
| ***G05B 19/00*** | (2006.01) |

(52) U.S. Cl.

CPC ............ *H02P 23/0004* (2013.01); *G05B 19/00* (2013.01); *H02P 23/005* (2013.01)

(58) Field of Classification Search

USPC ......... 318/369, 615, 611, 561, 268, 269, 275, 318/375, 575, 400.12, 639, 58, 61, 64, 90, 318/259, 136, 260, 262, 56, 60, 63, 362, 318/370, 372, 265, 279, 374; 701/86, 90, 701/91, 31.4, 22, 41; 903/903, 390, 946; 700/275, 86, 302, 245; 386/241, 44.26, 386/264, 338, 355; 369/53.31, 53.2, 47.14, 369/44.27, 53.1; 360/78.06, 75

See application file for complete search history.

(56) References Cited

U.S. PATENT DOCUMENTS

| | | | | |
|---|---|---|---|---|
| 6,998,810 | B2 * | 2/2006 | Kameyama | 318/609 |
| 7,750,592 | B2 * | 7/2010 | Eguchi | 318/561 |
| 2005/0065693 | A1 * | 3/2005 | Wang et al. | 701/70 |
| 2012/0229069 | A1 * | 9/2012 | Ohta et al. | 318/601 |

FOREIGN PATENT DOCUMENTS

| | | | |
|---|---|---|---|
| JP | 5-228794 | A | 7/1993 |
| JP | 6195118 | A | 7/1994 |

OTHER PUBLICATIONS

Patent Abstracts of Japan, Publication No. 6-195118, Published on Jul. 15, 1994, 1 page.

Notice of Grounds for Rejection issued in the counterpart Japanese Patent Application No. 2012-049211, mailed Aug. 18, 2015 (5 pages.

* cited by examiner

*Primary Examiner* — Shawki S Ismail
*Assistant Examiner* — Jorge L Carrasquillo
(74) *Attorney, Agent, or Firm* — Osha Liang LLP

(57) ABSTRACT

An acceleration command calculator calculates an acceleration command “as” based on an output torque Tmb of the spindle motor applied when the rotational speed is less than or equal to a base rotational speed and an inertia Jm+Jl of the overall spindle. A switching speed calculator calculates a control mode switching speed Vs based on the acceleration command “as”. A control mode switching switch switches from a speed control mode to a position control mode when the motor speed Vm becomes less than or equal to the control mode switching speed Vs, to stop the spindle at a desired rotational position. The control mode switching speed Vs may be a value calculated using the following equation: $Vs=60\times(amax\times0.5)^{1/2}$, where a maximum acceleration that can be achieved at this time is represented by a max.

8 Claims, 5 Drawing Sheets

SPINDLE POSITIONING DEVICE

CROSS-REFERENCE TO RELATED APPLICATION(S)

This application claims priority to Japanese Patent Application No. 2012-049211, filed on Mar. 6, 2012, which is incorporated herein by reference in its entirety.

BACKGROUND

1. Technical Field

The present invention relates to a positioning device for causing a spindle of a machine tool to stop at a desired position.

2. Related Art

With regard to positioning techniques for positioning and stopping a rotating spindle motor, it is desired that positioning be performed quickly and without overshoot. For such techniques, various attempts have heretofore been made.

FIG. 1 shows a block diagram of a typical spindle positioning device. A spindle 15 is driven to rotate by a spindle motor 11 via a transmission mechanism 12 to 14 including a gear and a belt. A speed detector 10 detects a speed of the spindle motor 11, and outputs a speed detection value Vm [$min^{-1}$]. A subtractor 6 uses the speed detection value Vm as a speed feedback value, and outputs a deviation Vd [$min^{-1}$] from a speed command Vc [$min^{-1}$], and, based on the deviation Vd, a speed controller 7 calculates and outputs a torque command Tc [Nm]. Based on the speed detection value Vm, a magnetic flux density command calculator 8 outputs a magnetic flux density command $\phi c$. A current controller 9 controls a current of the spindle motor 11 based on the torque command Tc and the magnetic flux density command $\phi c$.

When the speed detection value Vm becomes less than or equal to a motor base rotational speed Vb, an acceleration command calculator 32 calculates an acceleration "a" from a speed detection value Vm (T1) which is detected after a certain period of time T1 [s], using the following equation (1), and outputs it to a position command calculator 2 as an acceleration command "as". During the period of time T1, the speed command Vc is zero (Vc=0), which is equivalent to a state in which the speed is reduced at a maximum torque. As such, Ka in equation (1) is set to a coefficient of 1 or less to provide an acceleration command at which torque saturation does not occur during positioning deceleration.

$$a = \frac{2\pi}{60} \times \frac{Vb - Vm(T1)}{T1} \times Ka \tag{1}$$

A comparator 31 outputs, as a spindle motor speed state Sv, HIGH level when the speed detection value Vm is greater than or equal to the spindle motor base rotational speed Vb, and LOW level when the speed detection value Vm is less than the base rotational speed. The acceleration command calculator 32 outputs a control mode switching command Sc at HIGH level so that the control mode is set to speed control during the time when the spindle motor speed state Sv is at HIGH level, or until the calculation of equation (1) is completed. On the other hand, the acceleration command calculator 32 outputs the control mode switching command Sc at LOW level so that the control mode is set to position control when the spindle motor speed state Sv is at LOW level, and after the calculation of equation (1) has been completed. Further, the acceleration command calculator 32 outputs to the position command calculator 2 a control mode switching speed Vs at which the control mode is switched from the speed control to the position control. The control mode switching speed Vs takes any value less than Vb−Vm (T1). A control mode switching switch 5 outputs the speed command Vc output from a host control device 1 when the control mode switching command Sc is at HIGH level, and outputs the speed command Vc output from a position control proportional gain 4 when the control mode switching command Sc is at LOW level. In other words, the spindle positioning device operates in the speed control mode when the motor speed Vm is greater than or equal to the motor base rotational speed Vb, or until the acceleration command calculator 32 completes the calculation of the acceleration command "as", and switches the control mode after the calculation of the acceleration command "as" has been completed, to operate at the control mode switching speed Vs in the position control mode. Based on the acceleration command "as" (acceleration "a") and the control mode switching speed Vs, and a position command Pc [rad] for a position located within one rotation of the spindle, which is output from the host control device 1, the position command calculator 2 calculates an integer n which satisfies the following inequality (2), and at which the left side takes its minimum.

$$2\pi \times n + Pc \geqq \left(\frac{2\pi \times Vs}{60}\right)^2 \times \frac{1}{2a} \tag{2}$$

Based on the integer n calculated using inequality (2), a position $\alpha$ for causing the spindle to stop at a position located within one rotation of the spindle is calculated using the following equation (3).

$$\alpha = 2\pi \times n + Pc - \left(\frac{2\pi \times Vs}{60}\right)^2 \times \frac{1}{2a} \tag{3}$$

Based on the acceleration command "as", the control mode switching speed Vs, and the position $\alpha$ calculated using equation (3), a position command deviation $\Delta Pc$ is calculated to provide a speed command as shown in FIG. 2, and is output. A position detector 16 detects the position of the spindle 15, and outputs a position detection value Pd. A subtractor 3 uses the position detection value Pd as a position feedback value, and calculates a deviation from the position command deviation $\Delta Pc$. By multiplying the output from the subtractor 3 by the proportional gain, Kp, 4, the speed command Vc is calculated and output. Based on the speed command Vc, the spindle motor is controlled to be positioned and stopped. Because the spindle is decelerated based on the acceleration command "as" calculated using equation (1), and is positioned and stopped, positioning can be performed without torque saturation, without overshoot, and quickly.

As shown in FIG. 2, in order to position and stop the spindle at a predetermined position, stop control is performed in which a period during which the spindle is controlled to achieve a constant speed and a period during which the speed is reduced at a predetermined acceleration "a" are combined. The acceleration "a" is the maximum acceleration that can be achieved by the motor during braking in which the rotational speed is less than or equal to a base rotational speed. In the following description, control performed in a period in which the speed is constant is referred to as "constant speed control", control performed in a period in which the speed is reduced at the acceleration "a" is referred to as "maximum braking acceleration control", and control in which the above-described constant speed control and maximum braking acceleration control are sequentially performed to position and stop the spindle is referred to as "stop control".

The amount of rotation of the spindle from a certain rotational speed (for example, Vs) through deceleration at a certain acceleration until the spindle stops is uniquely determined. Conversely, when the rotational position at which the spindle is caused to stop is determined, the rotational position from which deceleration is started is uniquely determined. When the rotational position of the spindle at a certain point in time is not a position determined from a stop position, the spindle is rotated until the spindle reaches this position while the speed of the spindle is being maintained, and after that, deceleration is performed. By setting the acceleration during deceleration to the maximum possible acceleration, the spindle can be stopped in a short time.

In the related art shown in FIG. 1, it is possible to position and stop a rotating spindle without overshoot, and quickly. However, the acceleration command "as" is calculated only when the rotational speed is less than or equal to the spindle motor base rotational speed, and a certain amount of time is necessary to perform the calculation. As such, because a time T1 to measure an acceleration and a time to calculate the acceleration command "as" are required, the spindle is decelerated during those times, and the spindle speed may become lower than the optimum switching speed for achieving positioning in the shortest time. Therefore, there is a problem in that positioning cannot be performed in the shortest time.

SUMMARY

According to one aspect of the present invention, there is provided a spindle positioning device for causing a spindle to stop at a desired rotational position through stop control in which the spindle is controlled at a constant speed, and subsequently, deceleration control is performed at a maximum acceleration that can be achieved during braking (a maximum braking acceleration). The maximum braking acceleration is obtained beforehand based on an output torque of a spindle motor which drives the spindle, which is applied when the rotational speed is less than or equal to a base rotational speed, and a spindle system inertia which is a total inertia of the spindle and a structure which rotates together with the spindle. The output torque applied when the rotational speed is less than or equal to the base rotational speed is determined according to specifications of the spindle motor. The structure which rotates together with the spindle includes, for example, a rotor of the spindle motor, workpieces, and a chuck for gripping workpieces.

A stop control start speed which is the speed of the spindle motor at which the stop control is started is obtained beforehand. The stop control start speed is a speed for stopping the spindle in the shortest time. The actual time required to stop the spindle varies depending on the relationship between the position of the spindle at that time and the stop position. In other words, a distance between the position of the spindle at that time and the stop position may have a value of 0 to $2\pi$ [rad], and here, the shortest time that it takes until the spindle stops is obtained using the average value $\pi$ [rad].

When a stop command for the spindle is provided from a host device, the spindle motor is decelerated, and the rotational speed is monitored. When the rotational speed of the spindle motor reaches the stop control start speed, from then on, the control of the spindle is set to the position control. In other words, the control of the spindle is performed based on the position command provided from the host device and the spindle position which is fed back. Further, when the stop control start speed is reached, the above-described stop control is performed. In other words, the spindle is controlled at a constant speed over a certain period of time, and subsequently, deceleration control is performed using the maximum braking acceleration.

By obtaining the maximum braking acceleration and the stop control start speed beforehand, it is possible to start the stop control immediately.

The stop control start speed Vs may be a value calculated using the following equation: $Vs=60\times(a\ max\times 0.5)^{1/2}$, where the maximum braking acceleration is represented by a max. Further, an inertia of the overall spindle may be calculated based on a magnetic flux density command for the spindle motor, a magnetic flux density estimation value, and a motor speed.

As described above, by employing a spindle positioning device for positioning a spindle at a desired rotational position according to the present invention, it is possible to position the spindle at a desired rotational position without overshoot, and quickly.

DETAILED DESCRIPTION

Figure 1:
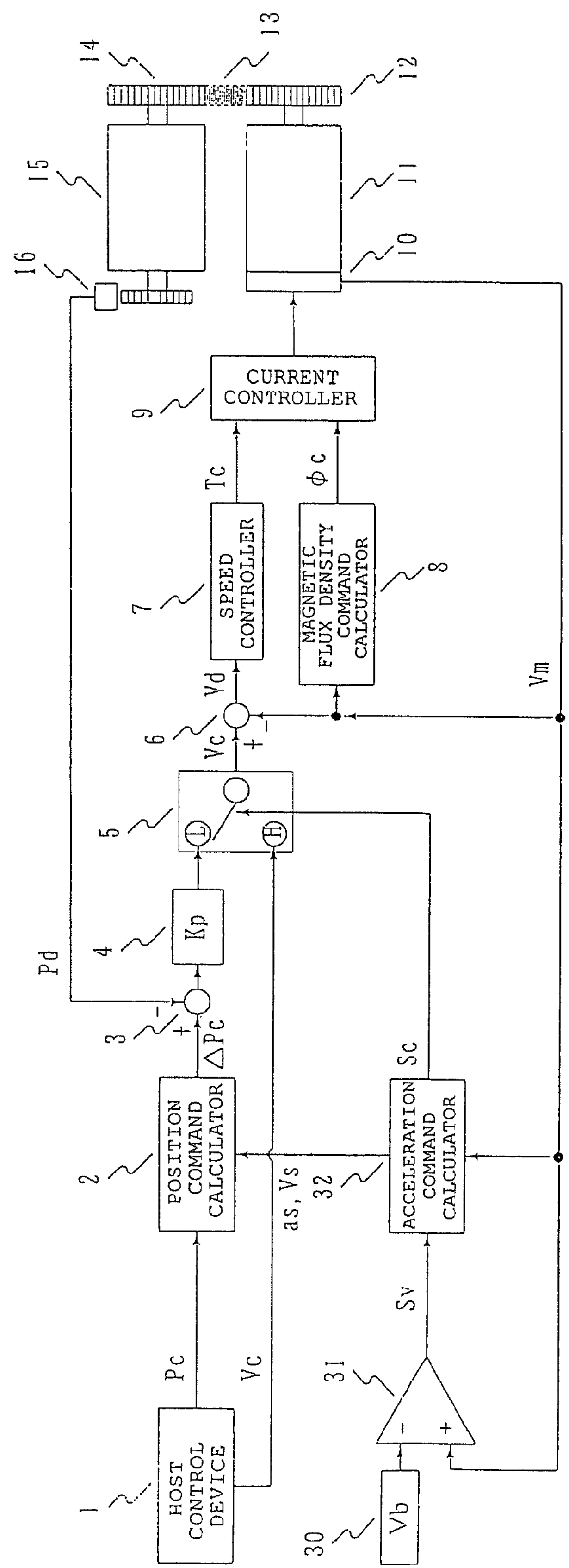
FIG. 1 is a block diagram showing a related art.
Figure 2:
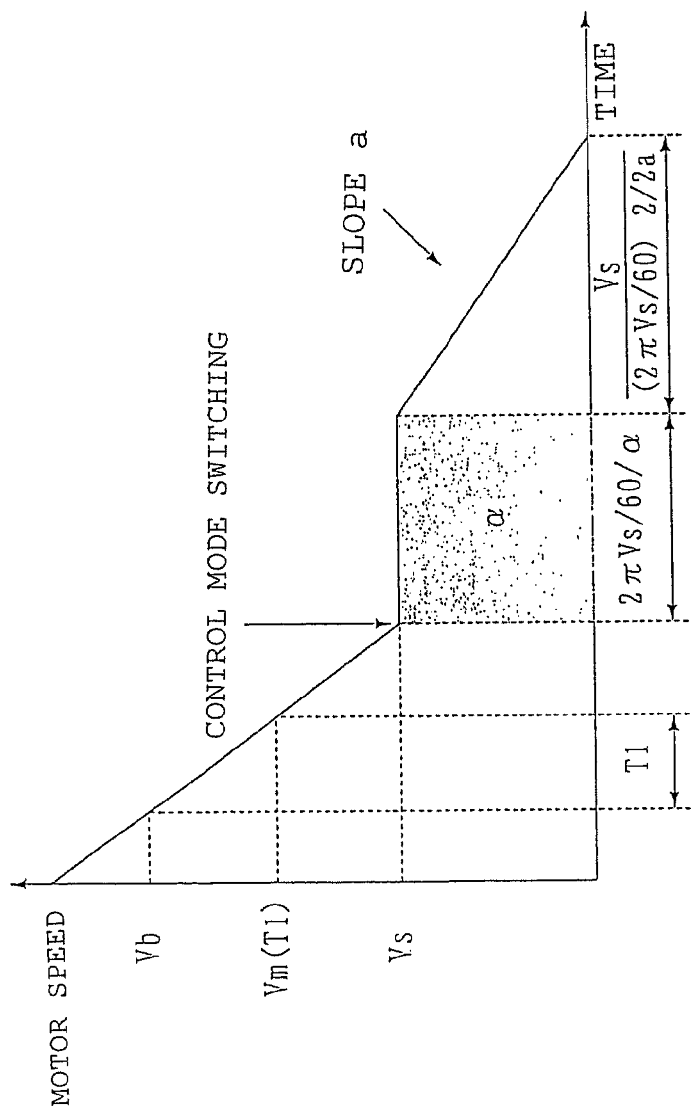
FIG. 2 is a graph for explaining a spindle positioning device according to the related art.
Figure 3:
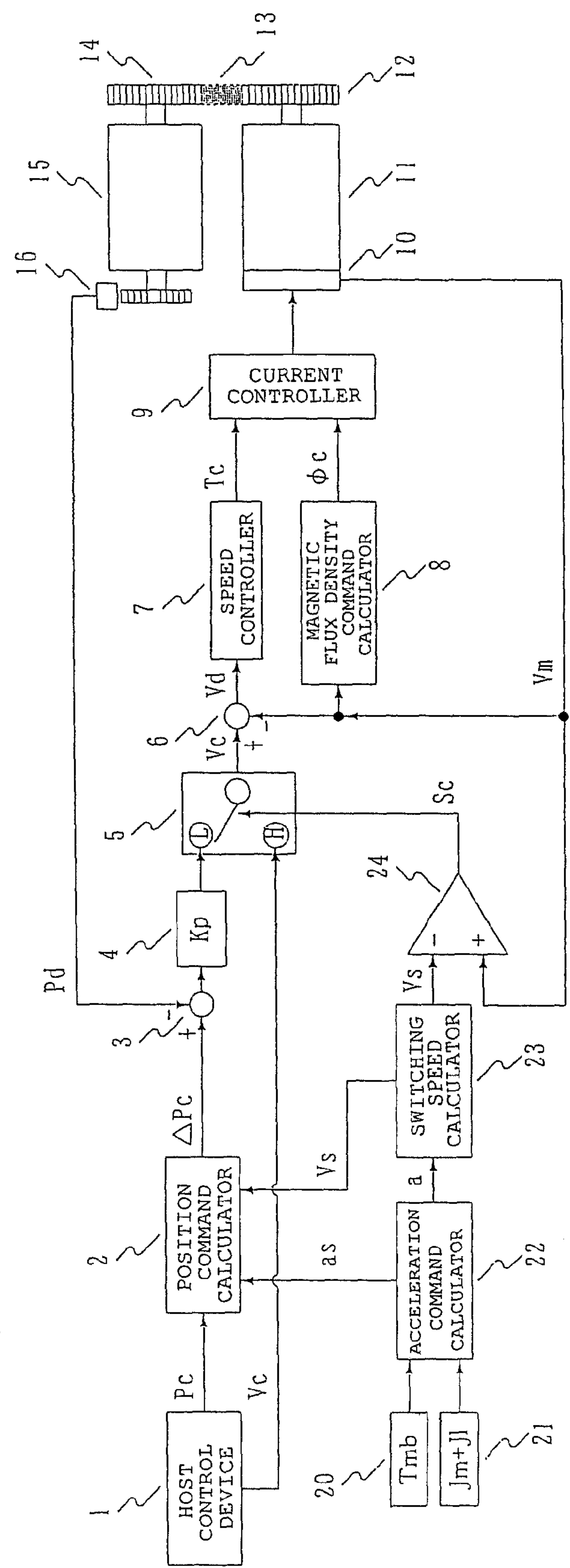
FIG. 3 is a block diagram showing a structure of an embodiment of the present invention.

Embodiments of the present invention will be described below. The same elements as those of the related art example are denoted by the same reference numerals, and their description will not be repeated here. FIG. 3 shows a control block diagram of the present invention. An acceleration command calculator 22 calculates an acceleration a max using the following equation (4) based on an output torque Tmb [Nm] of the spindle motor which is applied when the rotational speed is less than or equal to abase rotational speed, and an inertia of the overall spindle, Jm+Jl, which is a sum of an inertia Jm of the spindle motor and an inertia Jl of the spindle including a chuck and a workpiece. The acceleration a max is output as an acceleration command "as" to the position command calculator 2 and a switching speed calculator 23. The inertia Jm+Jl of the overall spindle is an overall inertia of the spindle and a structure which rotates together with the spindle, and corresponds to a load of the spindle motor. The output torque Tmb and the inertia Jm are set beforehand according to specifications of the spindle motor, and the inertia Jl is set beforehand according to specifications of the spindle and conditions of workpieces to be machined. It should be noted that Ka in equation (4) is set to a coefficient of 1 or less to provide an acceleration command at which torque saturation does not occur during positioning deceleration. The acceleration a max is a practical maximum acceleration that can be achieved by the spindle motor when the rotational speed is less than or equal to the base rotational speed.

$$a\max = \frac{Tmb}{Jm + J1} \times Ka \tag{4}$$

The switching speed calculator 23 calculates and outputs a speed Vs at which the stop control of the spindle is started, using the following equation (5) in which the acceleration command "as" is used as the acceleration a max. The speed Vs also serves as a switching speed Vs at which the control mode is switched from the speed control mode to the position control mode.

$$Vs = 60 \times \sqrt{a\max \times 0.5} \tag{5}$$

However, when the speed Vs calculated using equation (5) is greater than the base rotational speed Vb, the speed Vs is output on the assumption that Vs=Vb.

A comparator 24 outputs an H level signal as the switching signal Sc when the motor speed Vm becomes less than the control mode switching speed Vs. The control mode switching switch 5 switches from the speed control mode to the position control mode when the switching signal Sc becomes the H level. In other words, when the motor speed Vm becomes less than the control mode switching speed Vs, it switches to the position control mode. In the position control mode, the spindle is stopped at a desired rotational position.

Figure 4:
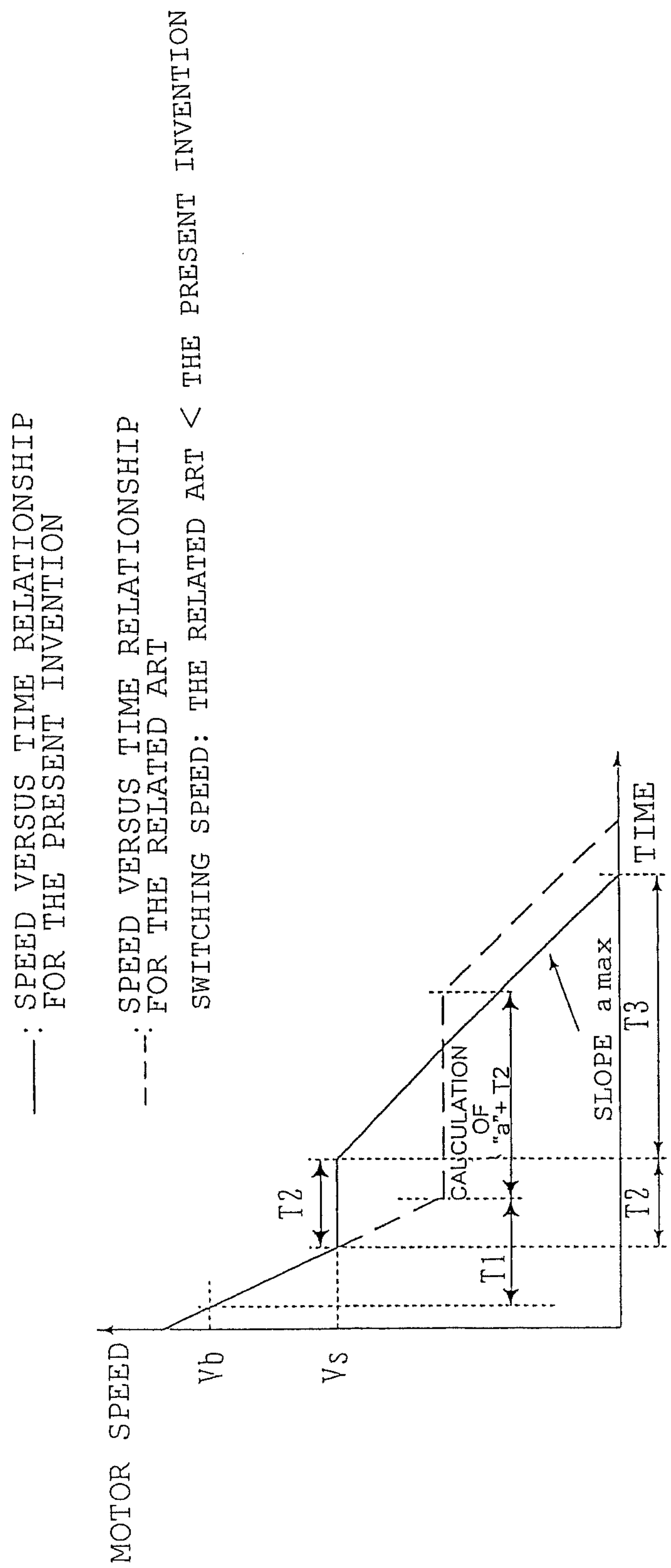
FIG. 4 shows a spindle motor speed versus time relationship.

FIG. 4 shows a speed versus time relationship for the present invention, and for the related art. Because the position $\alpha$ for causing the spindle to stop at a position located within one rotation of the spindle varies depending on the position within one rotation of the spindle, and may fall within any range from 0 to $2\pi$, the average value is a half rotation, $\pi$ [rad], and an average time T2 for the control mode switching speed Vs is a value of the following equation (6).

$$T2 = \frac{60 \times 0.5}{Vs} \tag{6}$$

Further, a time T3 that it takes after the control mode is switched to the position control until the spindle stops at a desired rotational position is a value of the following equation (7) in which the acceleration command "as" is used as the acceleration "a".

$$T3 = \frac{Vs}{60 \times a} \tag{7}$$

Therefore, a time T that it takes to stop the spindle at a desired rotational position is a value of the following equation (8) based on equation (6) and equation (7), in which the above-described maximum acceleration a max is used as "a".

$$T = T2 + T3 = \frac{60 \times 0.5}{Vs} + \frac{Vs}{60 \times a} \tag{8}$$

Here, the following inequality (9) holds true based on the relationship of arithmetic mean and geometric mean.

$$T \geqq 2 \times \sqrt{\frac{60 \times 0.5}{Vs} \times \frac{Vs}{60 \times a}} = 2\sqrt{\frac{0.5}{a}} \tag{9}$$

A minimum value Tmin for the time T of inequality (9) is a value for a case where the acceleration"a" of the following equation (10) is the above-described maximum acceleration a max.

$$T\min = 2\sqrt{\frac{0.5}{a}} \tag{10}$$

By substituting the minimum value Tmin for the time T, that is, equation (10) representing the condition under which the spindle can be stopped in the shortest time, into T of equation (8), and solving the equation with respect to Vs, equation (5) is obtained. Equation (5) can be calculated before the speed detection value Vm decreases to the base rotational speed Vb. In the related art, after the speed detection value Vm decreases to the base rotational speed Vb, a time T1 to measure an acceleration and a time to calculate the acceleration command "as" are required. As such, the present invention differs from the related art in terms of the time at which an acceleration is calculated. According to the present invention, it is possible to switch from the speed control mode to the position control mode at the switching speed Vs calculated using equation (5), at a time earlier than that in the related art. Therefore, the spindle can be stopped at a desired rotational position in the shortest time.

Figure 5:
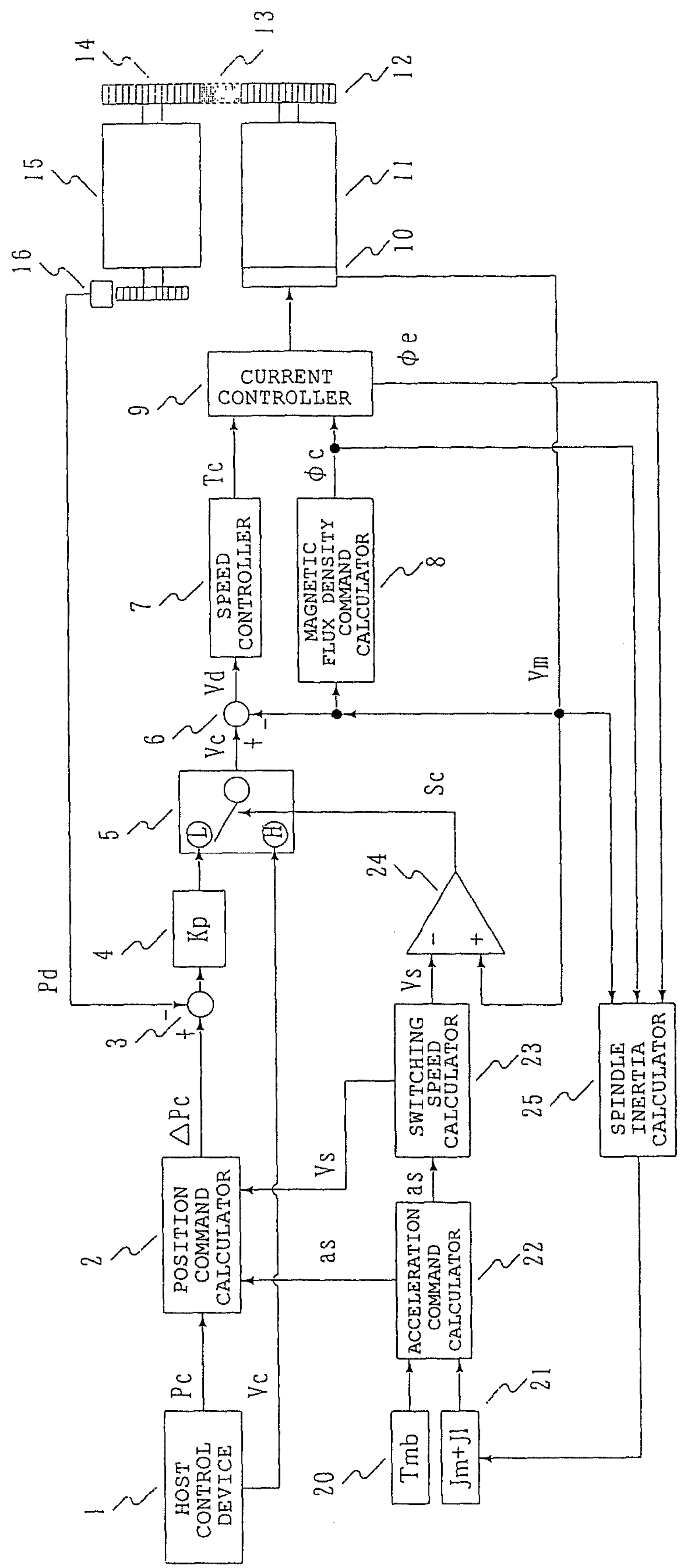
FIG. 5 is a block diagram showing a structure of another embodiment of the present invention.

Another embodiment of the present invention will be described below. The same elements as those of the above-described embodiment are denoted by the same reference numerals, and their description will not be repeated here. FIG. 5 shows another control block diagram of the present invention. The current controller 9 calculates and outputs a magnetic flux density estimation value $\phi e$ by means of, for example, a known magnetic flux density observer. A spindle inertia calculator 25 calculates an inertia Jm+Jl of the overall spindle beforehand based on the speed detection value Vm detected during acceleration and deceleration, the magnetic flux density command $\phi c$, and the magnetic flux density estimation value $\phi e$. For example, when the rotational speed is less than or equal to the base rotational speed, when it is assumed that a constant torque applied when the rotational speed is less than or equal to the base rotational speed is Tmb, a torque Tm which is actually output from the motor is a value of the following equation (11).

$$Tm(t) = \frac{\phi e(t)}{\phi c(t)} \times Tmb \tag{11}$$

When it is assumed that an acceleration applied when the rotational speed is less than or equal to the base rotational speed is a(t), Jm+Jl is a value of the following equation (12).

$$Jm + J1 = \frac{Tm(t)}{a(t)} \tag{12}$$

In this case, because an inertia of the overall spindle can be accurately estimated using the time when the rotational speed decreases to the base rotational speed, the spindle can be decelerated at a more optimum acceleration, and the spindle can be quickly stopped at a desired rotational position.

What is claimed is:

1. A spindle positioning device for positioning a spindle which is driven by a spindle motor, the spindle positioning device comprising:

a control unit comprising:

a speed detector for obtaining a rotational speed of the spindle motor;

a positioning controller for positioning the spindle by performing stop control which is composed of constant speed control in which the spindle is controlled at a constant speed and maximum acceleration control in which the spindle is controlled to be decelerated at a maximum braking acceleration;

an acceleration command calculator for obtaining a maximum braking acceleration beforehand based on an output torque of the spindle motor applied when the rotational speed is less than or equal to a base rotational speed, and a spindle system inertia which is a total inertia of the spindle and a structure which rotates together with the spindle, wherein the maximum braking acceleration is a maximum acceleration of the spindle which can be generated by the spindle motor during braking; and a switching speed calculator for obtaining a stop control start speed beforehand, wherein the stop control start speed is a rotational speed of the spindle motor at which the stop control is started, and which is for stopping the spindle in a shortest time, wherein when it is detected that the rotational speed of the spindle motor reaches the stop control start speed, the positioning controller performs position control based on a position command provided from a host device and a position of the spindle which is fed back, and sequentially performs the constant speed control and the maximum acceleration control.

2. The spindle positioning device according to claim 1, wherein the stop control start speed Vs [$\min^{-1}$]is calculated using the following equation: $Vs=60\times(a\ max\times 0.5)^{1/2}$, where the maximum braking acceleration is represented by a max [$rad/s^2$].

3. The spindle positioning device according to claim 1, further comprising:

a spindle inertia calculator for calculating the spindle system inertia based on a magnetic flux density command for the spindle motor, a magnetic flux density estimation value calculated by means of an observer, and a rotational speed of the spindle motor.

4. The spindle positioning device according to claim 1, wherein when it is detected that the rotational speed of the spindle motor reaches the stop control start speed, the positioning controller switches a control mode from speed control based on a speed command provided from the host device to the position control based on a position command provided from the host device and a position of the spindle which is fed back.

5. A method for positioning a spindle which is driven by a spindle motor, the method comprising:

obtaining, by the control unit (MCU), a maximum braking acceleration beforehand based on an output torque of the spindle motor applied when the rotational speed is less than or equal to a base rotational speed, and a spindle system inertia which is a total inertia of the spindle and a structure which rotates together with the spindle, wherein the maximum braking acceleration is a maximum acceleration of the spindle which can be generated by the spindle motor during braking;

obtaining, by the control unit (MCU), a stop control start speed beforehand, wherein the stop control start speed is a rotational speed of the spindle motor at which the stop control is started, and which is for stopping the spindle in a shortest time;

obtaining, by the control unit (MCU), a rotational speed of the spindle motor; and when it is detected that the rotational speed of the spindle motor reaches the stop control start speed, performing position control based on a position command provided from a host device and a position of the spindle which is fed back, and further performing stop control in which a constant speed control in which the spindle is controlled at a constant speed using the stop control start speed and a maximum acceleration control in which the spindle is controlled to be decelerated using the maximum braking acceleration are sequentially performed, to position the spindle at a desired rotational position.

6. The method according to claim 5, wherein the stop control start speed Vs [$\min^{-1}$] is calculated using the following equation: $Vs=60\times(a\ max\times 0.5)^{1/2}$, where the maximum braking acceleration is represented by a max [$rad/s^2$].

7. The method according to claim 5, further comprising:

calculating, by the control unit (MCU), the spindle system inertia based on a speed magnetic flux density command for the spindle motor, a magnetic flux density estimation value calculated by means of an observer, and a rotational speed of the spindle motor.

8. The method according to claim 5, further comprising:

when it is detected that the rotational speed of the spindle motor reaches the stop control start speed, switching a control mode from speed control based on a speed command provided from the host device to the position control based on a position command provided from the host device and a position of the spindle which is fed back.

* * * * *